(12) United States Patent
Zeidlhack (10) Patent No.: US 8,608,444 B2
(45) Date of Patent: Dec. 17, 2013

(54) SINGLE-BEARING STRUCTURE AND WIND POWER PLANT HAVING THE SINGLE-BEARING STRUCTURE

(75) Inventor: Rudolf Zeidlhack, Werneck (DE)

(73) Assignee: Schaeffler Technologies AG & Co. KG, Herzogenarach (DE)

( * ) Notice: Subject to any disclaimer, the term of this patent is extended or adjusted under 35 U.S.C. 154(b) by 600 days.

(21) Appl. No.: 12/847,249

(22) Filed: Jul. 30, 2010

(65) Prior Publication Data
US 2011/0027086 A1 Feb. 3, 2011

(30) Foreign Application Priority Data
Aug. 1, 2009 (DE) .................... 10 2009 035 750

(51) Int. Cl.
*F03D 11/04* (2006.01)

(52) U.S. Cl.
USPC ............ 416/174; 415/229; 384/504; 384/619

(58) Field of Classification Search
USPC .......... 384/548, 494, 504, 619; 415/110, 111, 415/229; 416/174
See application file for complete search history.

(56) References Cited

U.S. PATENT DOCUMENTS

2009/0175724 A1* 7/2009 Russ et al. ................... 416/131

FOREIGN PATENT DOCUMENTS

| DE | 8803970 U1 * | 5/1988 |
| DE | 101 022 55 | 8/2002 |
| DE | 10 2004 028 746 | 12/2005 |

OTHER PUBLICATIONS

Translation of DE8804970U1 provided by Espacenet.*
Translation of DE 102004028746 provided by Espacenet.*

* cited by examiner

*Primary Examiner* — Nathaniel Wiehe
*Assistant Examiner* — Justin Seabe
(74) *Attorney, Agent, or Firm* — Lucas & Mercanti, LLP (57) ABSTRACT

A single-bearing structure, in particular for use in a wind power plant, which has a low friction operating characteristic. The single-bearing structure for mounting a rotor in the wind power plant has two first rows of rolling bodies, which are arranged in the single-bearing structure such that their pressure lines intersect with one another and with a radial plane of a rotation axis of the single-bearing structure. The rolling bodies of the two first rows of rolling bodies are designed as cylindrical rollers.

14 Claims, 6 Drawing Sheets

SINGLE-BEARING STRUCTURE AND WIND POWER PLANT HAVING THE SINGLE-BEARING STRUCTURE

This application claims the priority of DE 10 2009 035 750.5 filed Aug. 1, 2009, which is incorporated by reference herein.

FIELD OF THE INVENTION

The invention relates to a single-bearing structure, preferably for a wind power plant, in particular for mounting the rotor in the wind power plant, having two first rows of rolling bodies, the rolling bodies of the two first rows of rolling bodies being arranged in the single-bearing structure such that their pressure lines intersect with one another and with a radial plane of a rotation axis of the single-bearing structure. The invention also relates to a wind power plant having this single-bearing structure for supporting the rotor and/or a hollow shaft of the rotor.

The conventional approach in supporting shafts is to support them by a locating/nonlocating bearing having at least two roller bearings that are installed at a spacing from one another. This locating/nonlocating bearing is encountered widely if, for example, consideration is given to the conventional design of a wind power plant in the region of the rotor bearing. A disadvantage of this concept is that the integration of the at least two roller bearings on the one hand can be cost intensive because of the number of the roller bearings, and on the other hand requires comparatively large overall space.

So-called single-bearing structures support the shaft only in one bearing region and must therefore also able to absorb axial loads and tilting moments, in addition to the usual radial loads.

Such a single-bearing structure is shown, for example, in document DE 101 022 55 A1, which describes a wind energy plant having a hollow shaft for rotor hub and generator. It is proposed to provide for the rotor only a single bearing, also having torques, between an axial sleeve and a hollow shaft supported thereon. The aim, in particular, is to consider as bearing a double-row angular contact roller bearing having roller rows arranged at an angle of approximately 90° to one another. As may be seen from the figures, the angular contact roller bearing is designed as a tapered roller bearing.

DE 10 2004 028 746 A1, which probably constitutes the closest prior art, also treats the mounting of the rotor of a wind energy plant. The rotor is held via at least one bearing in a tower head of the wind energy plant, the at least one bearing or, in accordance with FIG. 1, the exactly one bearing being designed as a single-bearing structure in the design of an angular contact roller bearing with tapered rollers as rolling bodies. The tapered rollers are adjusted to one another in order to be able to divert radial and axial loads as well as tilting movements.

DESCRIPTION

It is the object of the invention to propose a single-bearing structure, in particular for use in a wind power plant, and such a wind power plant, which is distinguished by a low friction operating characteristic.

This object is achieved by a single-bearing structure having the features of Claim 1, and by a wind power plant having the features of Claim 15. Preferred or advantageous embodiments of the invention follow from the subclaims, the subsequent description and the attached figures.

Within the scope of the invention, a single-bearing structure is proposed which is preferably suitable and/or designed for a wind power plant, in particular for mounting the rotor. A single-bearing structure is understood, in particular, as a bearing concept in the case of which all forces and moments are transmitted to an ambient structure from a shaft, hollow shaft or the rotor, which are supported by the single-bearing structure, in the region of a single bearing component. In particular, the single-bearing structure implements a single bearing concept, the single-bearing structure constituting the sole bearing. Specifically, the single-bearing structure is suitable and/or designed for absorbing and/or diverting axial and radial forces and tilting moments.

The single-bearing structure is designed in at least two rows, the rolling bodies being arranged in the single-bearing structure such that their pressure lines firstly intersect one another and secondly respectively intersect a radial plane in relation to the rotation axis of the single-bearing structure.

Pressure lines denote the lines which are defined by the contact points of the rolling bodies with an inner and an outer raceway of the single-bearing structure. In the case of balls as rolling bodies, the contact regions are idealized in a punctiform manner, whereas these regions are linear in the case of cylindrical rollers as rolling bodies, and so the pressure lines are, in addition, aligned perpendicular to the running surfaces of the inner and/or the outer raceway. The pressure line angle—also termed bearing angle or pressure angle—is the angle between the pressure line and the radial plane in relation to the rotation axis, that is to say a perpendicular plane in relation to the rotation axis, in a longitudinal section along the rotation axis. In the case of a row of rolling bodies which has a pressure line arranged parallel to the radial plane of the rotation axis, it is usual to employ the term of a pure radial bearing which can absorb only radial forces. The other extreme is that of a row of rolling bodies whose pressure line assumes an angle of 90° to the radial plane of the rotation axis, a pure axial bearing being involved in this case.

Owing to the fact that the pressure lines of the inventive single-bearing structure intersect one another, a new bearing is defined such that the single-bearing structure is capable of absorbing both axial and radial forces and, in addition, tilting moments. With particular preference, in a longitudinal section along the rotation axis, the single-bearing structure produces exactly two common points of intersection between the pressure lines and the radial plane, specifically exactly one per cutting region through the single-bearing structure.

As a distinction from the known prior art, it is proposed that the rolling bodies of the two first rows of rolling bodies are designed as cylindrical rollers. Cylindrical rollers have a circular shape in the cross section perpendicular to their longitudinal extent, the cross section being constant over the length of the cylindrical roller, or at least over 80% or 90% of the length of the cylindrical roller.

It has been found that the use of double-row tapered roller bearings according to the prior art firstly leads to comparatively excessively high production costs. Secondly, the shape of the tapered rollers has the effect that a proportion of the transmitted forces is diverted in the direction of the rotation axis of the tapered rollers, thus permitting a high loading to occur between the roller end face and the delimiting edge. Owing to the relatively high sliding friction resulting therefrom in the contact region between roller end face and edge, mixed friction and even metallic contact can result in conjunction with unfavorable lubrication conditions. The final consequence of this can be surface damage and premature wear accompanied by fatigue phenomena.

Owing to the use of cylindrical rollers as rolling bodies in the at least two first rows of rolling bodies, with reference to the rotation axis of the rollers there is no, or only a small, axial component on the rollers and thus on the edges, since the rolling bodies are cylindrical. The edge friction between edge and roller end face is much reduced by the absence of axial loading, thus rendering possible continuous operation that is low in friction and thus low in wear.

In a preferred design embodiment of the invention, the pressure lines of the at least two first rows of rolling bodies are selected in a so-called O-arrangement, the pressure lines intersecting radially outside the two first rows of rolling bodies. Owing to the O-arrangement of at least double-row roller bearings it is possible for all forces and moments occurring to be absorbed. In the case of less preferred, but also possible embodiments of the invention, a so-called X-arrangement is implemented, the pressure lines meeting radially inside the two first rows of rolling bodies.

It is particularly preferred for the pressure lines of the at least two first rows to be designed with a steep angle, that is to say one between 30° and 70°, preferably between 40° and 50° and, in particular, at 45° such that very high tilting moments can also be absorbed optimally.

It is certainly possible in principle for the two first rows of rolling bodies to have different pitch circles, different diameters and/or lengths of the rolling bodies and/or pressure line angles, but it is preferred when the two first rows of rolling bodies are arranged symmetrically in relation to the radial plane of the rotation axis.

It is provided in an advantageous design implementation that the two first rows of rolling bodies have a free spacing in an axial direction which is smaller than four times the length of a rolling body of the two first rows of rolling bodies. Alternatively or in addition, it may be provided that this spacing is designed to be smaller than 500 mm, preferably smaller than 300 mm and, in particular, smaller than 200 mm. In the case of this relatively small spacing, what is involved is therefore not a protective spacing as with conventional double bearing concepts, but only a spacing apart of the two first rows of rolling bodies as required by design.

Alternatively or in addition, it may be provided that the at least two first rows of rolling bodies roll on a common region of an outer ring or an inner ring, which region is in one piece, preferably at least in sections in the circumferential direction, in particular in one piece in the entire circumferential direction. It is particularly preferred for the outer ring and/or the inner ring to be fabricated from a roller bearing steel or stainless steel which is fully or case hardened, but with particular preference to have no so-called slip zone, that is to say unhardened raceway regions. Said design of the outer ring and/or inner ring enables a compact design of the single-bearing structure, the bearing load ratings and the service life needing to be calculated exactly using the standard DIN ISO 281. In the case of other embodiments, use is made instead of said materials of heat-treated steels, likewise preferably free from slip zones. Raceways with hardness values >58 HRc seem to be particularly advantageous.

In a particular preferred embodiment of the invention, an or the outer ring on which the first two rows of rolling bodies roll has interfaces for screwing the outer ring onto an ambient structure. The interfaces are designed, in particular, as through openings through which the screws or bolts for fastening can be guided. Alternatively or in addition, it is also possible to fasten threaded bolts on the outer ring. With the aid of these or similar modifications, the outer ring becomes an independent component which can be installed in the ambient structure preferably in a self-supporting and/or unsupported fashion. It is particularly preferred when the single-bearing structure is already present after pre-assembly as a self-locking, ready to install component which can then be used in the respective application. Alternatively or in addition, it is also possible for the inner ring(s) to have interfaces for screwing to a connection structure. In particular, axially introduced bores for fastening by means of screws can be provided as interfaces.

The inventive single-bearing structure is particularly preferred when it has a pitch circle diameter for the two first rows of rolling bodies, and/or a free inside diameter of greater than 500 mm, preferably greater than 1000 mm and, in particular, greater than 1500 mm. This ensures that the single-bearing structure can be used with particular preference as a large bearing to which particularly heavy loads are applied given its dimensions.

In a development of the invention, it may be provided that two further rows of rolling bodies are used, the at least two further rows of rolling bodies having the same pressure line angle, or at least largely having the same pressure line angle as the two first rows of rolling bodies. Largely equal pressure line angles are understood as angles which lie in a range of ±5° of the pressure line angles of the two first rows of rolling bodies. The rolling bodies of the further rows of rolling bodies may, in a similar way, be cylindrical rollers, but also alternatively balls, as rolling bodies.

It is thus possible by way of example for the single-bearing structure to have a total of four, six or eight rows of rolling bodies with cylindrical rollers all of which are arranged at the same or largely the same pressure line angle as the two first rows of rolling bodies. In other examples, the single-bearing structure may have a combination of rows of rolling bodies with cylindrical rollers on the inside radially and rows of balls on the outside radially in order that tiltings between the bearing rings can be more effectively compensated. This is possible in this combination since the balls exhibit a more pronounced spring behavior than the cylindrical rollers. For similar reasons, it is also possible to use various sizes of rolling bodies or various pitch circles. In the case of another embodiment, the row of cylindrical rollers is arranged between two rows of balls in a radial direction.

It is even possible for the single-bearing structure to have at least six rows of rolling bodies, that is to say eight or ten rows of rolling bodies, in order to produce an optimum supportive behavior. It is also particularly preferred that the rows of rolling bodies exhibit as the rolling bodies balls and cylindrical rollers alternating in a radial direction.

So as to remove the axial forces sufficiently via the single-bearing structure, it is preferred when all rows of rolling bodies of the single-bearing structure have a pressure line angle of absolute value greater than 10°, preferably greater than 20°.

In order to obtain a variant favorable in terms of fabrication, it is preferred that the contact points and/or contact lines of the rows of rolling bodies on an axial half of the single-bearing structure in the longitudinal section through the rotation axis of the single-bearing structure lie on a common line or, viewed in three dimensions, on a common cone. This definition is preferably valid both for the inner ring and for the outer ring.

A further subject matter of the invention relates to a wind power plant having a rotor, the rotor being supported by a single-bearing structure in the sense of a single-bearing concept according to one of the preceding claims.

The rotor of the wind power plant is therefore supported in the ambient structure decisively or even exclusively by the single-bearing structure. The rotor may, in particular, be supported via a hollow shaft. Very compact wind power plants can be erected by means of the single-bearing structure.

Further features, advantages and effects emerge from the following description of preferred exemplary embodiments of the invention, as well as from the attached figures, in which.

Mutually corresponding components or variables are respectively provided with reference numerals corresponding to one another.

Figure 1:
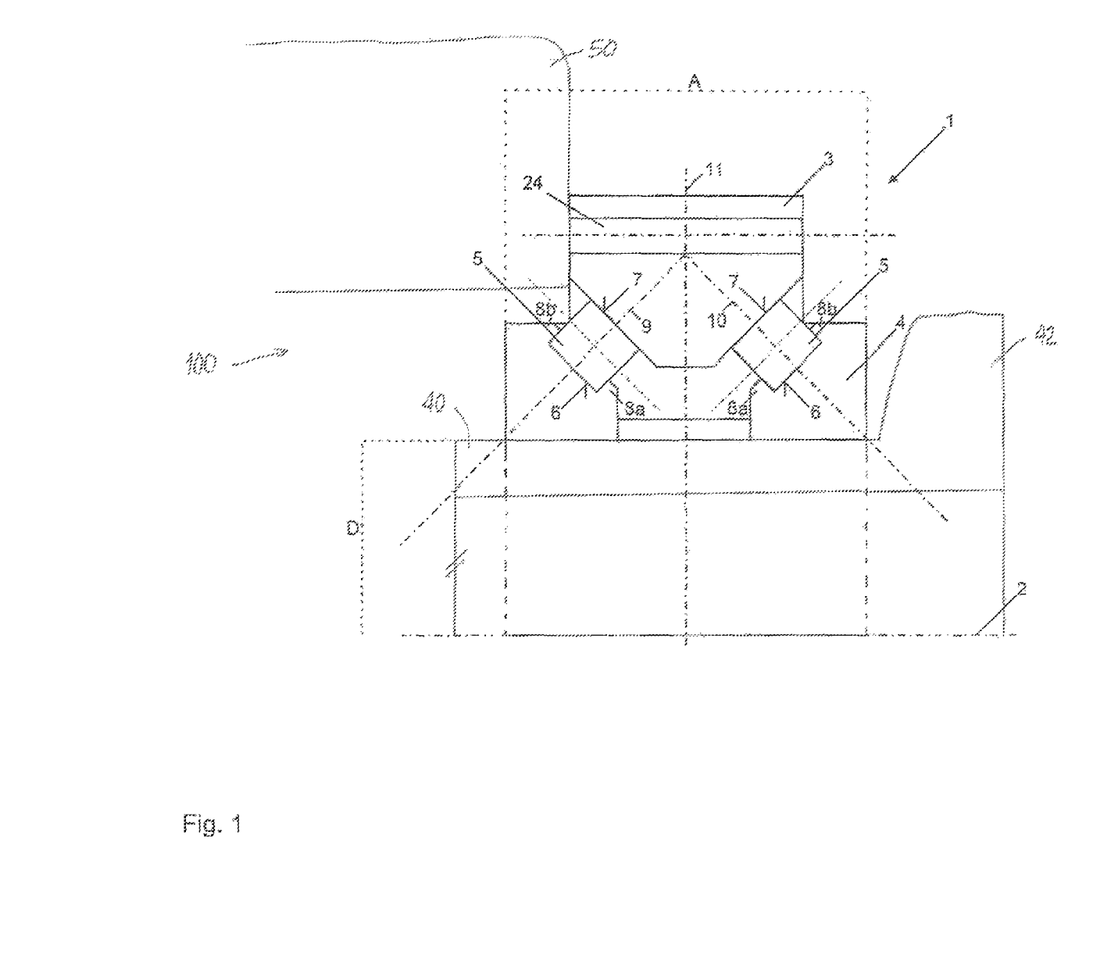
FIG. 1 shows a schematic longitudinal section through a single-bearing structure as a first exemplary embodiment of the invention.

FIG. 1 shows a single-bearing structure 1 in a schematic illustration of a longitudinal section along the rotation axis 2 thereof as a first exemplary embodiment of the invention. The single-bearing structure 1 has a free inside diameter D of greater than 500 mm or even greater than 1000 mm. It is designed to be used for continuous rotational movements. For example, the single-bearing structure 1 or the single-bearing structures still to follow is/are used to support a rotor of a wind energy plant in relation to an ambient structure. The single-bearing structure 1 forms the sole support bearing given the integration, and thereby implements a single-bearing concept.

The single-bearing structure 1 comprises an outer ring 3 which is a one-piece design in this exemplary embodiment, and an inner ring 4 which—at least for assembly reasons—is designed in multipart fashion in an axial direction. Both the inner ring 4 and outer ring 3 can be implemented by segments in a circumferential direction for particular embodiments. Two first rows of rolling bodies are arranged between the inner ring 4 and outer ring 3, the rolling bodies being embodied as cylindrical rollers 5. The cylindrical rollers 5 roll on inner raceways 6 of the inner ring 4 and on outer raceways 7 of the outer ring 3, the inner and outer raceways 6, 7 being aligned in pairs parallel to one another. The outer ring 3 is implemented without an edge, whereas the inner ring 4 has an inner and an outer edge 8a, b for each row of the cylindrical rollers 5. Given a design with an X-arrangement, the outer ring 3 comprises two rings and is therefore divided in an axial direction, and the inner ring can be of one-piece design.

The single-bearing structure 1 is implemented as a double-row angular cylindrical roller bearing, the cylindrical rollers 5 respectively being adjusted such that pressure lines 9, 10 result which meet radially outside in the radial plane 11 in relation to the rotation axis 2. The pressure lines 9, 10 include an angle of approximately 45° with the radial plane 11 and an angle of approximately 90° with one another. The rows of rolling bodies of the cylindrical rollers 5 are therefore positioned in a O-arrangement.

Owing to the fixing of the pressure lines 9, 10, the single-bearing structure 1 is capable of absorbing not only axial and radial forces, but also tilting moments. Because the design precludes the possibility of transmitting a force in an axial direction of the cylindrical rollers 5, the load between the end face of the rolling bodies 5 and the edges 8a, b is slight by virtue of the nonexistent axial components, and this leads to a low edge friction and thus to low wear.

The outer ring 3 and the inner ring 4 are formed, in particular, in regions of the raceways 6, 7 from a roller bearing steel or case hardened steel which is fully hardened or case hardened. It is particularly advantageous when no slip zones occur in the region of the raceways 6, 7, in order to be able to permanently absorb constant bearing rotational speeds in this bearing location. In addition, the use of said materials is helpful in that the bearing load ratings and the service life can be calculated exactly using the current standard DIN ISO 281.

It is to be stressed in particular in the case of the integration that the axial extent A of the single-bearing structure 1 is slight, for example less than 500 mm, preferably less than 300 mm. In the case of other embodiments, the axial extent can be defined as follows. Starting from half the difference between the maximum outside diameter (or housing bore diameter or radial support diameter) and the free inside diameter of the single-bearing structure, the axial extent A is to be less than four times this half difference.

Figure 2:
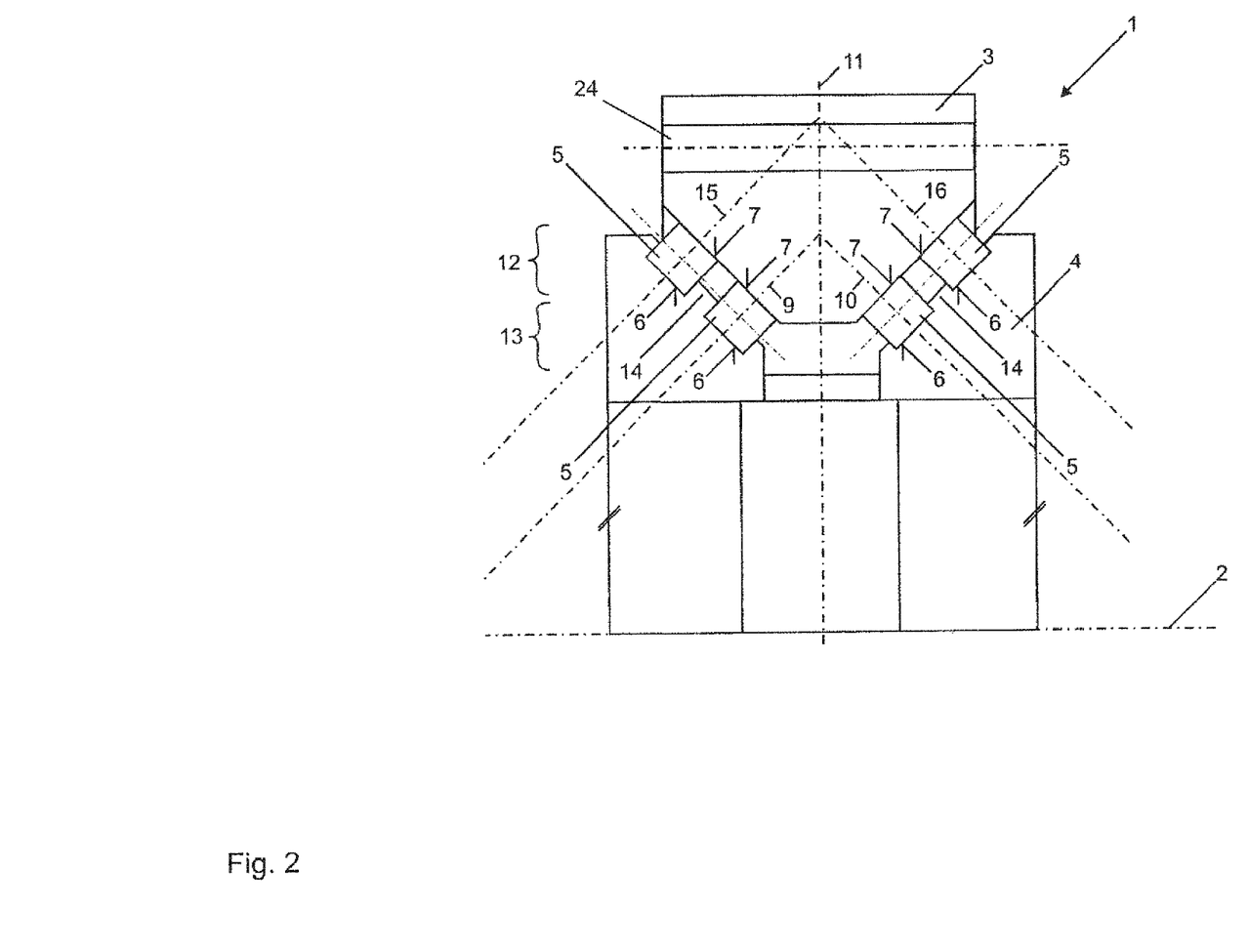
FIG. 2 shows a second exemplary embodiment of the invention in an illustration the same as FIG. 1.

FIG. 2 shows a modification of the single-bearing structure 1 of FIG. 1, in contradistinction thereto a further double row of rolling bodies in the form of cylindrical rollers 5 being introduced into the single-bearing structure 1. In this example, the further double row 12 is designed with identical cylindrical rollers 5 as in the first double row 13. In the case of alternative embodiments, it is also possible to use other cylindrical rollers 5. In this example, the raceways 7 of the cylindrical rollers 5 of the first and the second double row 12, 13 on the outer ring 3 are on a common line or, viewed in three dimensions, on a common cone. The raceways 6 of the two double rows 12, 13 are separated from one another by an intermediate edge 14, but likewise lie on a common line or on a common cone.

The pressure lines 15, 16 of the cylindrical rollers 5 of the second double row 12 are arranged parallel to the pressure lines 9, 10 of the first double row 13. This positioning of the raceways 6, 7 or pressure lines 9, 10, 15, 16 can be produced particularly advantageously in terms of production engineering, but it is also possible to conceive of the raceways 6, 7 not lying on a common cone.

Figure 3:
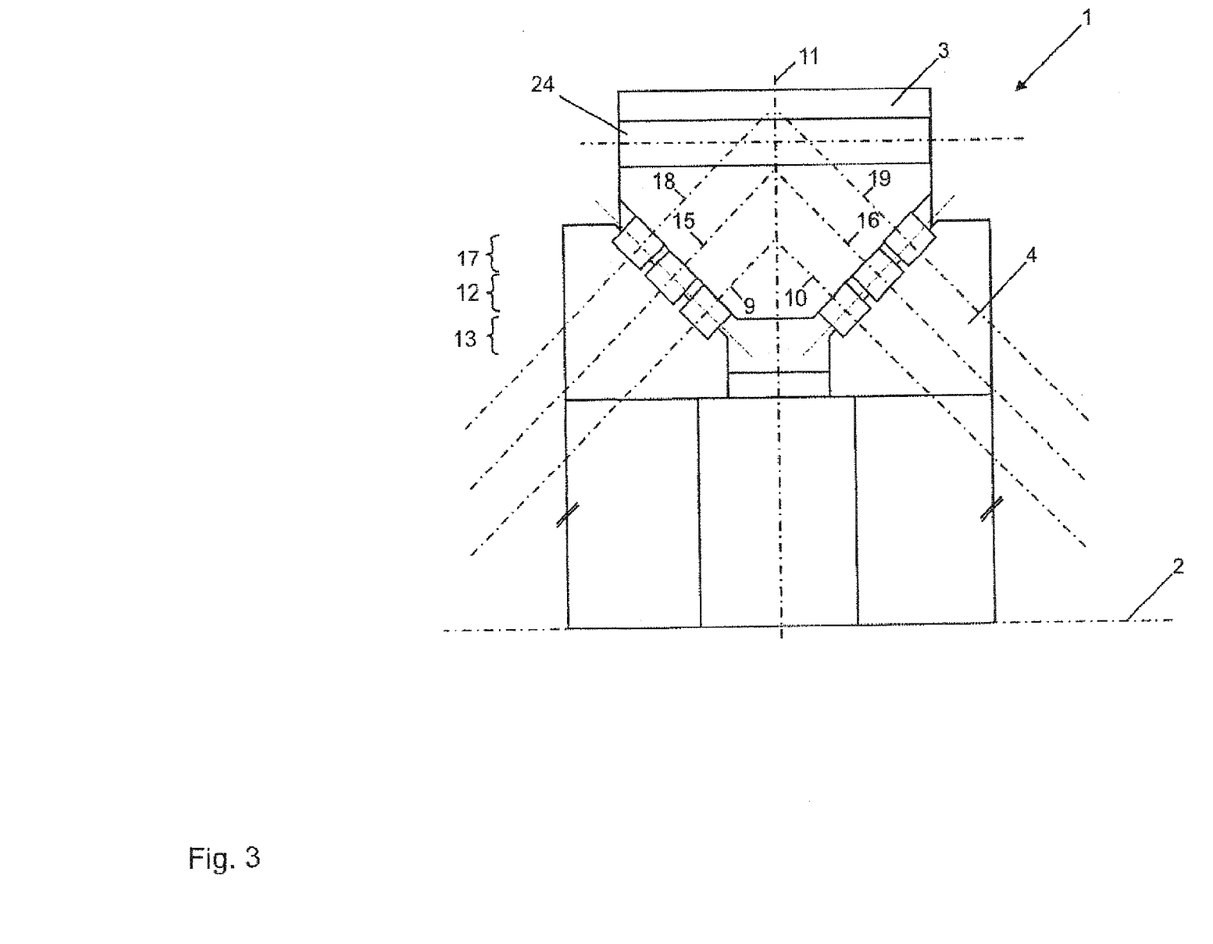
FIG. 3 shows a third exemplary embodiment of the invention in an illustration the same as the foregoing figures.

FIG. 3 shows a third exemplary embodiment of the invention, by comparison with the preceding figures there being arranged a third double row 17 of cylindrical rollers 5 whose raceways 6, 7 are located in turn on a common line or a common cone with the raceways of the other cylindrical rollers 5 of the two other double rows 12, 13. The pressure lines 18, 19 are also respectively parallel to the pressure lines 9, 10 and 15, 16.

Figure 4:
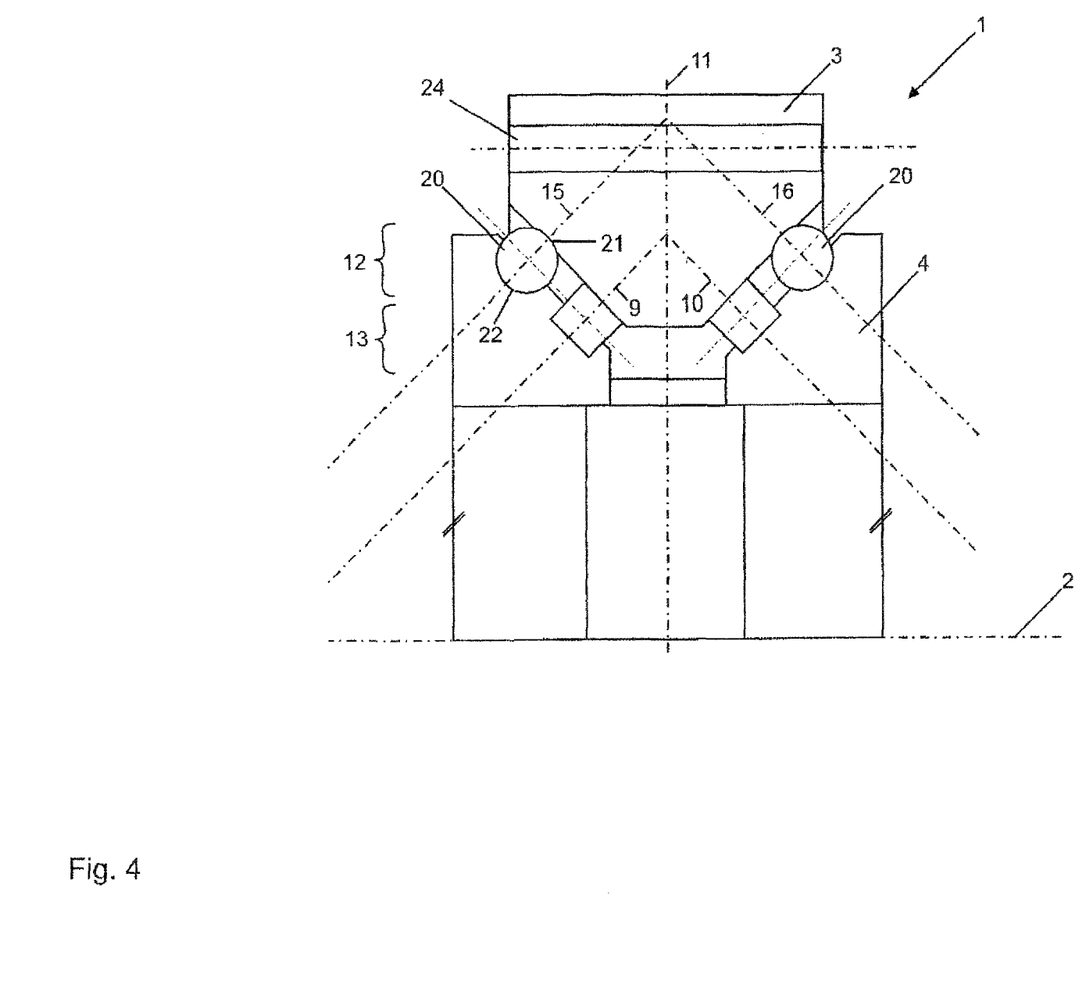
FIG. 4 shows a single-bearing structure having different rolling bodies as a fourth exemplary embodiment of the invention in an illustration the same as the foregoing figures.

FIG. 4 shows a fourth exemplary embodiment of a single-bearing structure 1, which differs in essence from the design of FIG. 2 in that instead of cylindrical rollers 5 balls 20 are now arranged as rolling bodies in the second double row 12. However, in a way similar to FIG. 2, the pressure lines 15' of the second double row 12 are aligned parallel to the pressure lines 9, 10. In this example, the contact points of the balls 20 with the inner ring 4 and outer ring 3 do not lie on a common line with the raceways 6, 7. The grooves 21 and 22 of the second double row 12 are designed in a known way to be close fitting such that in the unloaded state only the contact points are formed along the pressure line 15 or 16.

Figure 5:
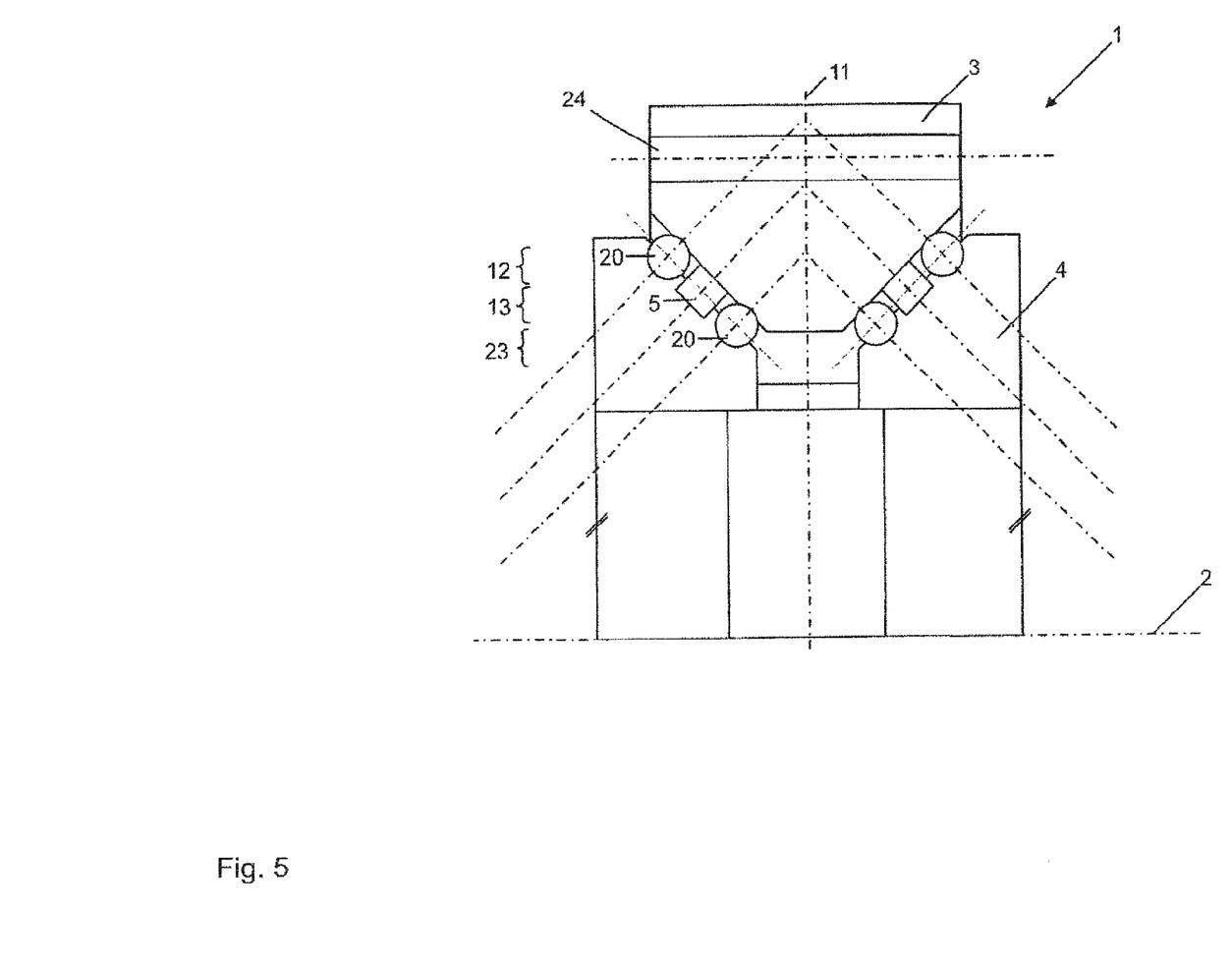
FIG. 5 shows a further modification of the single-bearing structure as a fifth exemplary embodiment of the invention in an illustration the same as the foregoing figures.

FIG. 5 shows a further exemplary embodiment of the single-bearing structure 1, by comparison with the exemplary embodiment 4 a further double row 23 of rolling bodies, designed as balls 20, being integrated such that a ball 20 is now firstly arranged in a radial direction, then a cylindrical roller 5, and then a ball 20 once again. The size of the balls 20 of the double row 23 can be the same as or different from that of the balls 20 of the double row 12. Particular advantages of this embodiment are to be seen in that in a dynamic operation the double rows 12, 23 with the balls 20 as rolling bodies is more resilient by comparison with the double row 13 with the cylindrical rollers 5 such that precisely tiltings of the bearing rings relative to one another can be absorbed particularly effectively.

Figure 6:
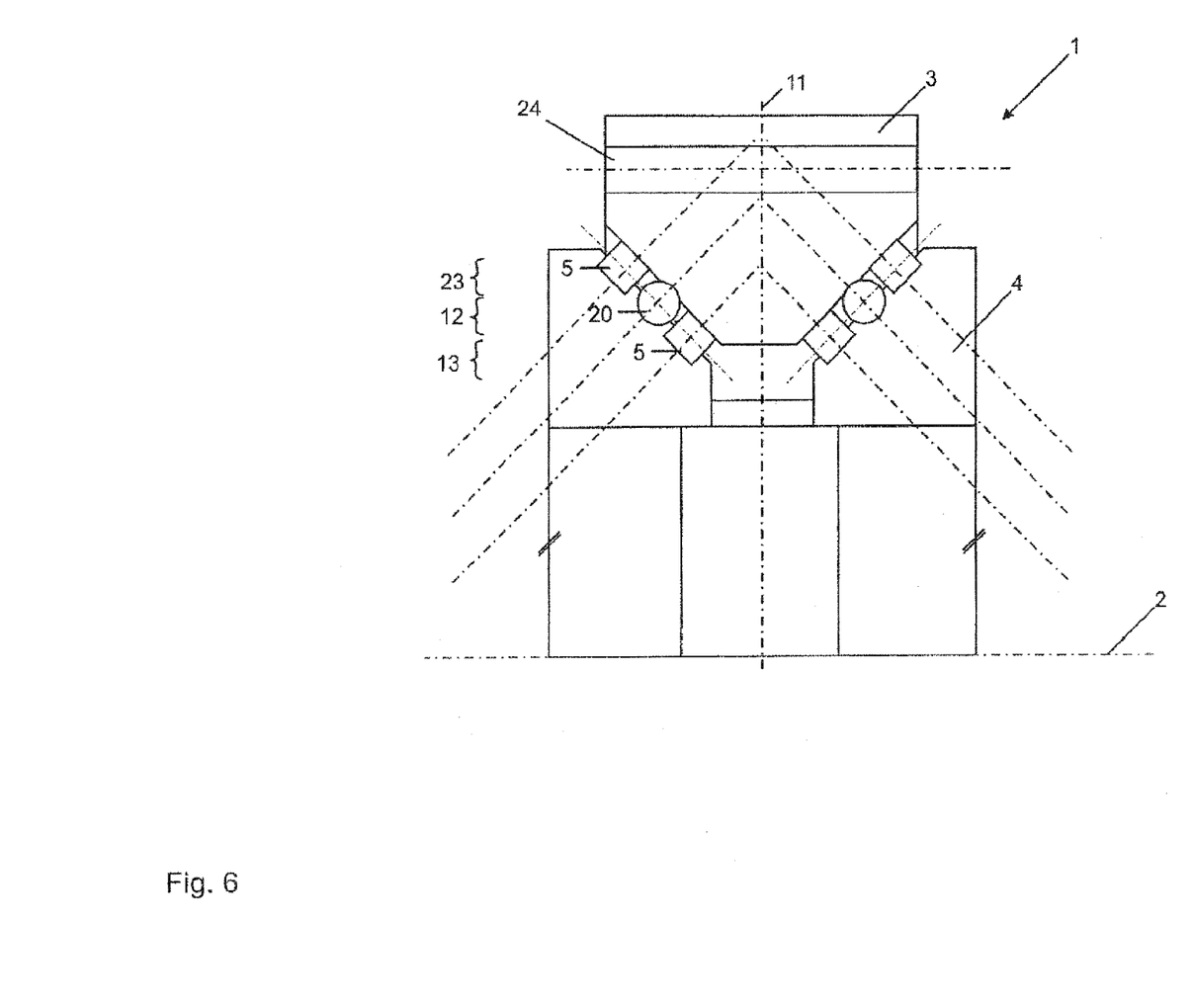
FIG. 6 shows a sixth exemplary embodiment of the invention in an illustration the same as the foregoing figures.

Finally FIG. 6 shows a sixth exemplary embodiment of the invention, the double rows now having in a radial direction cylindrical rollers 5, balls 20 and then cylindrical rollers 5 once again. However, in further exemplary embodiments it is also possible to use even more double rows and to select other sequences of the rolling bodies in a radial direction.

In a way similar to the case of the cylindrical rollers 5, in the case of the balls 20 as rolling bodies only a slight friction is produced during operation in the design as an angular contact ball bearing, such that a very slight total friction, and thus a low wear are also to be expected for the mixed single-bearing structures 1 in accordance with FIGS. 4, 5 and 6.

Provided in an axial direction in the outer ring 3 in the case of all embodiments are through openings 24 which enable the outer ring 3 to be fastened to an end face of an ambient structure. In the case of an integration of the ambient structure 1 in a wind energy plant, this configuration as an independent component permits the outer ring 3 to be fixed in an ambient structure, for example a generator housing 50, and the inner ring 4 to be screwed with a hollow shaft 40 which is connected to the rotor in a rotatably fixed fashion. A wind power plant 100 with a generator housing 50 and a rotor 42 with a hollow shaft 40 is shown schematically in FIG. 1. The hollow shaft may be limited to a length of less than 1500 mm or 1200 mm. The support spacing in double bearing concepts is replaced in the case of the single-bearing structure 1 by a very large pitch circle diameter of even, for example, more than 1500 mm.

The outer ring 3 may be dimensioned such that there is no need for the single-bearing structure 1 to be supported in a radial direction in a fashion which is positive and fully circumferential. In the case of other implementations, the outer ring 3 is surrounded stiffly in a radial fashion over the entire circumference. The ideal is for the outer ring 3 to be completely supported radially without play in the ambient structure, particularly in the housing or in an appropriate bore. If appropriate, the outer ring need not be surrounded over the entire width of the outer ring. Thus, for example, a short radial guidance could suffice.

LIST OF REFERENCE NUMERALS

1 Single-bearing structure
2 Rotation axis
3 Outer ring
4 Inner ring
5 Cylindrical rollers
6 Inner raceway
7 Outer raceway
8a Inner edge
8b Outer edge
9 Pressure line
10 Pressure line
11 Radial plane
12 Second double row
13 First double row
14 Intermediate edge
15 Pressure lines
16 Pressure line
17 Third double row
18 Pressure line
19 Pressure line
20 Balls
21 Grooves
22 Grooves
23 Double row
24 Through opening

The invention claimed is:

1. A single-bearing structure for a wind power plant for mounting a rotor in the wind power plant, comprising:
   two first rows of rolling bodies, the rolling bodies of the two first rows of rolling bodies being arranged in the single-bearing structure such that pressure lines intersect with one another and with a radial plane of a rotation axis of the single-bearing structure,
   wherein the rolling bodies of the two first rows of rolling bodies are designed as cylindrical rollers, and
   at least two further rows of rolling bodies, the at least two further rows of rolling bodies having a same angle of the pressure lines as the first two rows of rolling bodies, wherein contact points and/or contact lines of the rows of rolling bodies on an axial half of the single-bearing structure in a longitudinal section through the rotation axis of the torque bearing lie on a common line or on a common cone.

2. The single-bearing structure of claim 1, wherein the pressure lines of the rolling bodies of the two first rows of rolling bodies form a O-arrangement.

3. The single-bearing structure of claim 1, wherein at least one of the pressures lines of the two first rows of rolling bodies is at an angle of between 30° and 70° to the radial plane of the rotation axis of the single-bearing structure.

4. The single-bearing structure of claim 1, wherein the pressure lines of the two first rows of rolling bodies are arranged symmetrically relative to one another in relation to the radial plane of the rotation axis of the single-bearing structure.

5. The single-bearing structure of claim 1, wherein the two first rows of rolling bodies roll on a common region of the outer ring.

6. The single-bearing structure of claim 1, wherein the outer ring, on which the first two rows of rolling bodies roll, has interfaces for screwing the outer ring onto the ambient structure.

7. The single-bearing structure of claim 1, wherein the single-bearing structure is a self-locking, ready to install component.

8. The single-bearing structure of claim 1, wherein one of a pitch circle diameter of the two first rows of rolling bodies, and a free inside diameter of the inner ring is greater than 500 mm.

9. The single-bearing structure of claim 1, wherein the at least two further rows of rolling bodies have cylindrical rollers or balls as rolling bodies.

10. The single-bearing structure of claim 1, wherein the single-bearing structure comprises a total of at least six rows of rolling bodies.

11. The single-bearing structure of claim 1, wherein the rows of rolling bodies have rolling bodies balls and cylindrical rollers alternating in a radial direction.

12. The single-bearing structure of claim 1, wherein all the rows of rolling bodies of the single-bearing structure have a pressure angle of absolute value greater than 10°.

13. A wind power plant, comprising:
   a rotor, an ambient structure, and a single-bearing structure, the rotor or a hollow shaft of the rotor being exclusively supported relative to the ambient structure through the single-bearing structure, and the single-bearing structure being connected to the rotor and the ambient structure to allow the rotor to rotate relative to the ambient structure, wherein the single-bearing structure comprises:

two first rows of rolling bodies, the rolling bodies of the two first rows of rolling bodies being arranged between the inner ring and the outer ring in the single-bearing structure such that pressure lines intersect with one another and with a radial plane of a rotation axis of the single-bearing structure, wherein the rolling bodies of the two first rows of rolling bodies are designed as cylindrical rollers, and at least two further rows of rolling bodies, the at least two further rows of rolling bodies having a same angle of the pressure lines of the first two rows of rolling bodies on an axial half of the single-bearing structure in a longitudinal section through the rotation axis of the torque bearing lie on a common line or on a common cone.

14. The wind power plant of claim 13, wherein the rotor includes a hollow shaft and the ambient structure is part of a generator housing, the single-bearing structure connected to the hollow shaft and the part of the generator housing.

\* \* \* \* \*